United States Patent
Liu et al.

(10) Patent No.: US 11,026,315 B2
(45) Date of Patent: Jun. 1, 2021

(54) DEVICE, SYSTEM, AND METHOD FOR DETERMINING OCCUPANCY FOR AUTOMATED LIGHTING OPERATIONS

(71) Applicant: SIGNIFY HOLDING B.V., Eindhoven (NL)

(72) Inventors: Chang Liu, Eindhoven (NL); Yuting Zhang, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/639,707

(22) PCT Filed: Jul. 31, 2018

(86) PCT No.: PCT/EP2018/070722
§ 371 (c)(1),
(2) Date: Feb. 17, 2020

(87) PCT Pub. No.: WO2019/038035
PCT Pub. Date: Feb. 28, 2019

(65) Prior Publication Data
US 2020/0221558 A1 Jul. 9, 2020

Related U.S. Application Data

(60) Provisional application No. 62/548,480, filed on Aug. 22, 2017.

(30) Foreign Application Priority Data

Sep. 22, 2017 (EP) ..................................... 17192730

(51) Int. Cl.
*H05B 47/115* (2020.01)
*H05B 47/16* (2020.01)

(52) U.S. Cl.
CPC .......... *H05B 47/115* (2020.01); *H05B 47/16* (2020.01)

(58) Field of Classification Search
CPC .... H05B 47/10; H05B 47/105; H05B 47/115; H05B 47/13; H05B 47/16
See application file for complete search history.

(56) References Cited

U.S. PATENT DOCUMENTS 5,986,357 A  11/1999 Myron et al.
10,372,097 B2 *  8/2019 Hyman ................ G05B 13/024
(Continued)

FOREIGN PATENT DOCUMENTS

WO  2017067864 A1  4/2017
WO  2017134091 A1  8/2017

*Primary Examiner* — Jason Crawford
(74) *Attorney, Agent, or Firm* — Daniel J. Piotrowski (57) ABSTRACT

A device, system, and method determines occupancy for automated lighting operations. The system includes an occupancy sensor generating a first measurement of an occupancy within a location that illuminated by lights in a lighting system. The system includes a photosensor generating a second measurement of an illumination level within the location, the illumination level indicative of the occupancy within the location. The system includes a control device determining an occupancy state in the location based on the first measurement and determining a result of validating the determined occupancy state based on the second measurement. An agreement between the first and second measurements validating the determined occupancy state while a discrepancy invalidating the determined occupancy state. The control device generates a signal based on the result which is received by a manual on-auto off device to perform a corresponding operation on the lighting system.

12 Claims, 3 Drawing Sheets

(56) References Cited

U.S. PATENT DOCUMENTS

| | | | |
|---|---|---|---|
| 2006/0197664 A1* | 9/2006 | Zhang | G06T 7/246 340/555 |
| 2008/0265796 A1* | 10/2008 | Null | H05B 47/105 315/291 |
| 2010/0176733 A1 | 7/2010 | King | |
| 2012/0057050 A1 | 3/2012 | Ashdown | |
| 2012/0153868 A1* | 6/2012 | Gu | H05B 47/115 315/307 |
| 2012/0235579 A1* | 9/2012 | Chemel | F21V 21/15 315/152 |
| 2012/0299728 A1* | 11/2012 | Kirkpatrick | G08B 13/189 340/541 |
| 2013/0069543 A1* | 3/2013 | Mohan | G08B 19/005 315/155 |
| 2014/0239817 A1* | 8/2014 | Leinen | F21S 8/006 315/152 |
| 2014/0318716 A1* | 10/2014 | Patel | H04Q 9/00 160/1 |
| 2015/0014539 A1 | 1/2015 | Sreedharan et al. | |
| 2015/0184842 A1 | 7/2015 | Chemel et al. | |
| 2016/0116343 A1* | 4/2016 | Dixon | H05B 47/11 250/342 |
| 2016/0120007 A1 | 4/2016 | Rein | |
| 2016/0295671 A1 | 10/2016 | Mohan et al. | |
| 2016/0323969 A1* | 11/2016 | Aliakseyeu | H05B 47/105 |
| 2018/0242430 A1* | 8/2018 | Gopal Samy | H05B 47/105 |
| 2018/0295704 A1* | 10/2018 | Haverlag | H05B 47/105 |

* cited by examiner

DEVICE, SYSTEM, AND METHOD FOR DETERMINING OCCUPANCY FOR AUTOMATED LIGHTING OPERATIONS

CROSS-REFERENCE TO PRIOR APPLICATIONS

This application is the U.S. National Phase application under 35 U.S.C. § 371 of International Application No. PCT/EP2018/070722, filed on Jul. 31, 2018, which claims the benefit of U.S. Patent Application No. 62/548,480, filed on Aug. 22, 2017 and European Patent Application No. 17192730.4, filed on Sep. 22, 2017. These applications are hereby incorporated by reference herein.

BACKGROUND INFORMATION

A lighting system may include a set of lights that illuminate a location. The lighting system may be configured with various options, particularly the mechanism by which the lights in the location are activated and deactivated. In a first example, the activation and/or deactivation of the lights may be manual. Accordingly, a manual input (e.g., flipping a light switch) may be required to either activate or deactivate the lights. In a second example, the activation and/or deactivation of the lights may be automated. Accordingly, the lighting system may be equipped with the necessary components that detect when and for long the lights are to be activated or deactivated. In a third example, a combination of the above mechanisms may be used.

There may be various pros and cons associated with a lighting system that incorporates a manual approach to activating or deactivating the lights. For example, when a manual input is required, the lights will only be activated by a person providing the required input. The manual input requirement ensures that the lights remain deactivated until required, thereby minimizing light activation time and consumption of power. In another example with more substantial consequences, when a manual input is required to deactivate the lights, the lights may remain activated until this manual input is provided. Those skilled in the art will appreciate how the manual input to deactivate the lights may become problematic as the lights may remain activated for no apparent reason (e.g., no people in the location) due to the lights not being manually deactivated.

When the lighting system incorporates an automated approach to activating or deactivating the lights, there may also be various pros and cons that are associated. If operating as intended, the automatic activation may occur whenever a person is detected to be in the location while the automatic deactivation may occur whenever no people are detected in the location. The automated activation/deactivation may also optimize power consumption and the life of the light equipment as the lights are only being used when people are present. However, those skilled in the art will understand that the automated mechanisms have issues relative to the manner in which the detection of people is performed.

The automated approach to activating and/or deactivating lights in a lighting system may utilize an occupancy sensor to detect when at least one person is in the location such that the lights are activated while the at least one person is detected. The occupancy sensor (also referred to as motion light sensors) may detect occupancy of a space by a person and turn the lights on or off automatically for residential and commercial applications. One or more occupancy sensors may be equipped in the wall, on the ceiling, with or separate from a wall switch, any of which may be connected to the lighting system in a wired or wireless manner.

There are various types of occupancy sensors that may be used to detect a person. For example, the occupancy sensor may use passive infrared (PIR), ultrasonic, tomographic motion detection, microwave sensing, camera-based detection, etc. Among these types of occupancy sensors, the PIR occupancy sensor is the type that is most widely used. As those skilled in the art will understand, the PIR occupancy sensor provides a low cost, a small form factor, and low power requirements especially for wireless applications while still providing the capability of detecting a person. Specifically, the PIR occupancy sensor operates by detecting movements of heat sources in a direct range of view. However, the PIR occupancy sensor only detects major movements and is prone to generating a false negative of occupancy (e.g., detecting no person when a person is actually present). On the opposite spectrum, although higher cost, the ultrasonic sensor operates by emitting a pulse into the space and receiving the reflected pulse to detect any difference (even from minor movements). However, the fine-grained nature of the ultrasonic occupancy may allow to detect even the smallest movement but is prone to generating a false positive of occupancy (e.g., detecting occupancy when there is no person actually present).

In fact, the most common known problem of occupancy sensors is that they generate false positive and/or false negative signals in certain circumstances. The false positive and false negative signals are used by a control system of the lighting system which leads to unnecessary energy waste (from the lights remaining activated) and disruption of necessary lighting functions (from the lights being inadvertently deactivated). Furthermore, the false positive signals may lead to non-compliance with regulations that are in place for energy conservation that may lead to financial penalties.

As those skilled in the art will understand, energy code requirements have been increasingly considered in lighting standards and regulations. Specifically, energy conservation and lowering energy usage in lighting scenarios is included in these lighting standards and regulations. With regards to energy conservation, as noted above, there are advantages and disadvantages to using either the manual approach or automated approach of activating and deactivating the lights of a lighting system. One manner of optimizing energy saving is to use a hybrid manual/automated approach. Specifically, a manual on—auto off (MOAO) control may enable a greatest energy saving with control capabilities. In fact, for example, California Title 24 Building Efficiency Standards 2013 and later in 2016 and 2019 (which are in the California legislation), mandatorily requires a manual on with automatic off control to reduce power usage based upon a type of location (e.g., room or area) as well as the luminaire (e.g., lighting intensity) used in residential and non-residential buildings that include outdoor spaces. In another example, interior lighting control requirements specified in ASHRAE/IES 90.1-2013 and IECC 2015 both require that a certain level of manual on control is enforced as a minimum restriction so that automatic control devices do not automatically activate the lights to a highest intensity in most spaces (e.g., a theatre, a penitentiary, a religious building, a sports arena, a classroom, a lecture hall, a training room, a conference room, a meeting room, a multipurpose room, a confinement cell, a copy/print room, etc.). An option that may be used is to activate the lights to an intermediate intensity. In view of the standards and regulations that have passed or are being considered, a hybrid manual and automated approach in which an automatic off control or an automatic full off control is being widely applied in indoor spaces during a compliance course of building codes.

With the MOAO control being mandatory in certain instances and considered in others, the lights of the lighting system are only allowed to be manually turned on by a person (e.g., to its full intensity while a dimmer intensity may still be automated) and allowed to be automatically turned off after a period of time-out when the location is determined to not be occupied. This restriction in building codes has the intention of avoiding false positive and/or false negative signals triggered by the environment (e.g., a non-human object moving that is detected as occupancy by a person). However, the MOAO control may incorporate the occupancy sensor. Since the MOAO may utilize the occupancy sensor and in view of the various problems described above, the MOAO control remains to produce false positives and false negatives.

With the wide usage of PIR occupancy sensors for their low cost advantage, many advanced algorithms are being developed to solve this obstacle of generating false positives and false negatives. Indeed, if the control system for a lighting system were to incorporate more complex and higher intelligence components, the false positives and false negatives may be entirely eliminated. However, these complex components introduce a significantly higher cost factor when the use of the PIR occupancy sensor is selected for its cost effectiveness. Therefore, these complex components do not provide the appropriate solution to the PIR occupancy sensors with a MOAO control. Instead, a more cost effective solution is required to minimize false positives and false negatives that allows for the PIR occupancy sensors to remain being used, particularly since many indoor locations have already adopted these components.

SUMMARY

The exemplary embodiments are directed to a system, comprising: an occupancy sensor configured to generate a first measurement of an occupancy within a location that is configured to be illuminated by at least one light in a lighting system; a photosensor configured to generate a second measurement of an illumination level within the location, the illumination level indicative of the occupancy within the location; a control device determining an occupancy state in the location based on the first measurement, the control device determining a result of validating the determined occupancy state based on the second measurement, an agreement between the first and second measurements validating the determined occupancy state, a discrepancy between the first and second measurements invalidating the determined occupancy state, the control device configured to generate a signal based on the result; and a manual on-auto off (MOAO) device receiving the signal to perform a corresponding operation on the lighting system.

The exemplary embodiments are directed to a method, comprising: receiving a first measurement of an occupancy within a location being illuminated by at least one light of a lighting system; receiving a second measurement of an illumination level within the location, the illumination level indicative of the occupancy within the location; determining an occupancy state in the location based on the first measurement; determining a result of validating the determined occupancy state based on the second measurement, an agreement between the first and second measurements validating the determined occupancy state, a discrepancy between the first and second measurements invalidating the determined occupancy state; and generating a signal based on the result for a manual on-auto off (MOAO) device to perform a corresponding operation on the lighting system.

The exemplary embodiments are directed to a control device, comprising: receiving circuitry configured to receive a first measurement of an occupancy within a location being illuminated by at least one light of a lighting system and a second measurement of an illumination level within the location, the illumination level indicative of the occupancy within the location; processing circuitry configured to determine an occupancy state in the location based on the first measurement, the processing circuitry configured to determine result of validating the determined occupancy state based on the second measurement, an agreement between the first and second measurements validating the determined occupancy state, a discrepancy between the first and second measurements invalidating the determined occupancy state, the processing circuitry configured to generate a signal based on the result; and a manual on-auto off (MOAO) device receiving the signal to perform a corresponding operation on the lighting system.

DETAILED DESCRIPTION

The exemplary embodiments may be further understood with reference to the following description and the related appended drawings, wherein like elements are provided with the same reference numerals. The exemplary embodiments are related to a device, a system, and a method for determining occupancy for automated lighting operations in a location. Specifically, the exemplary embodiments may provide a mechanism for automated operations that control whether the lights in the location are activated or deactivated. The mechanism of the exemplary embodiments may also be configured to control the lights being partially activated at an intensity less than the maximum intensity. As will be described in further detail below, a control system for a lighting system of the location may include a hybrid manual approach and automated approach that minimizes false positives and false negatives that are produced from an occupancy sensor.

As will be described in further detail below, the exemplary embodiments may take advantage of a manual on auto—auto off (MOAO) device that includes a hybrid manual approach and automated approach. The MOAO may incorporate an occupancy sensor that generates an occupancy signal corresponding to whether a location is occupied or empty. The exemplary embodiments incorporate a photosensor that generates an illumination signal corresponding to whether a location is illuminated beyond a predetermined threshold. Based on the illumination signal, the mechanism according to the exemplary embodiments may determine whether the occupancy signal is a correct signal or corresponds to one of a false positive or a false negative for occupancy. Through correction of when the occupancy signal is a false indication, the exemplary embodiments may correctly take the appropriate action in illuminating the location. Through incorporation of relatively low cost components, the mechanism according to the exemplary embodiments provide a substantially cost effective manner of minimizing operations based on false indications of occupancy that further align with laws and regulations directed to power conservation in lighting systems.

Figure 1:
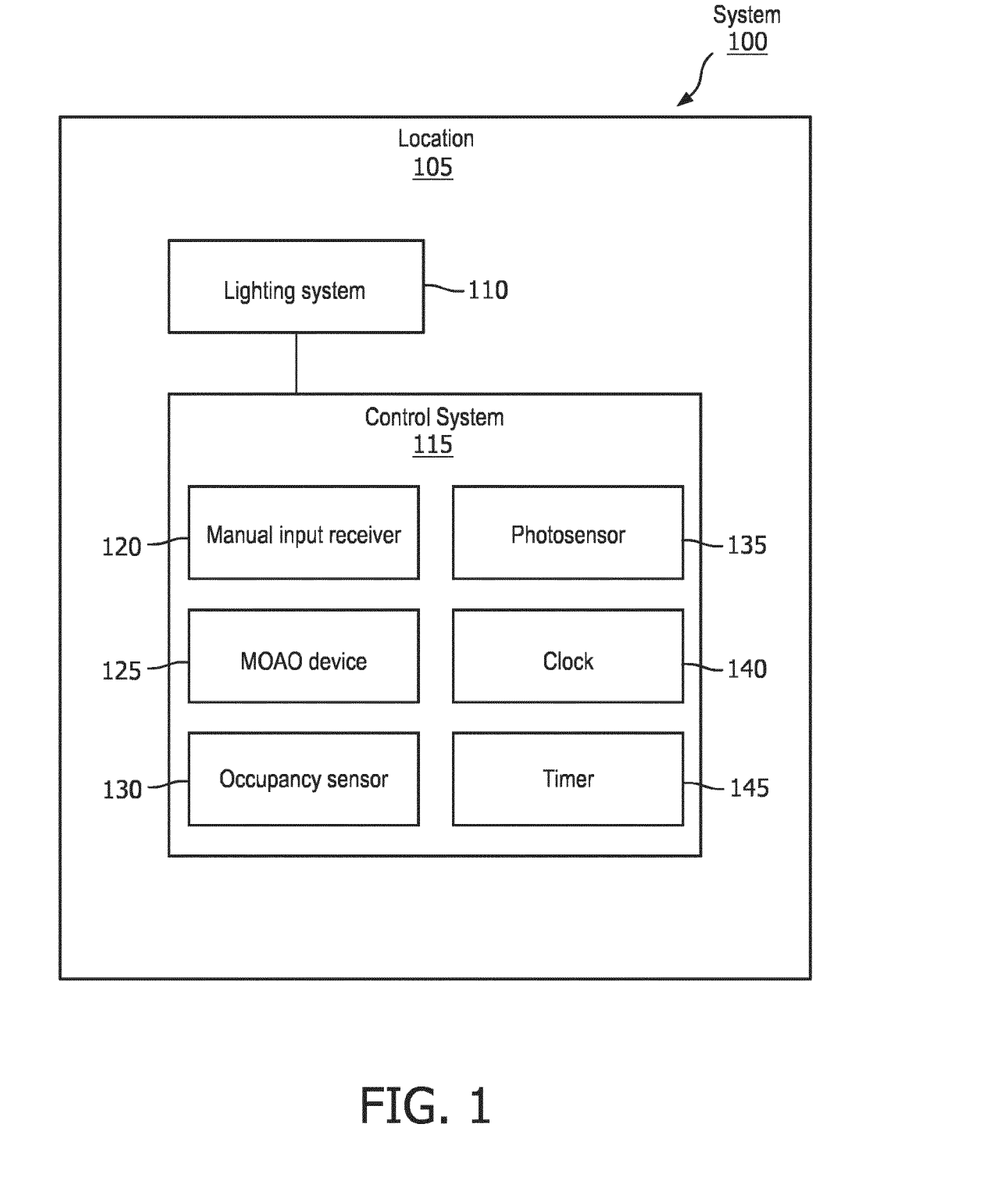
FIG. 1 shows a system according to the exemplary embodiments.

FIG. 1 shows a system 100 according to the exemplary embodiments. The system 100 relates to a location 105 including a lighting system 110 and a control system 115 that controls how the lighting system 110 operates. The system 100 is illustrated where the components of the control system 115 are incorporated into one overall system. However, it is noted that the components of the control system 115 may be separated from one another while having a communication functionality therebetween, modular components (e.g., separate components connected to one another), incorporated into one or more devices, or a combination thereof. It is also noted that the system 100 shows a wired connection between the lighting system 110 and the control system 115. However, those skilled in the art will understand that any manner of communication of signals or other indications/commands may be used between the systems 110, 115, between the components of the control system 115, etc. For example, a wired connection, a wireless connection, a network connection, or a combination thereof may be used.

The location 105 may be any area in which the lighting system 110 provides illumination in either a commercial site or a residential site. In a first example, the location 105 may be an outdoor location. For example, when the outdoor location is a commercial site, the location 105 may be a plaza adjacent a building, an atrium, etc. In another example, when the outdoor location is a residential site, the location 105 may be a patio, a driveway, a deck, etc. In a second example, the location 105 may be an indoor location. For example, when the indoor location is a commercial site, the location 105 may be a floor of a building, an interior of a warehouse, a room or office in the building, etc. In another example, when the indoor location is a residential site, the location 105 may be a bedroom, a living room, a garage, etc.

The system 100 may relate to the location 105 being used for different purposes. Accordingly, when the location 105 is used for commercial purposes, there may be an associated first timeframe in which the location 105 is expected to utilize the lighting system 110. Similarly, when the location 105 is used for residential purposes, there may be an associated second timeframe such as opposite the first timeframe in which the location 105 is expected to utilize the lighting system 110. For example, an office in a financial institution may have ordinary operating hours from 9:00 am to 5:00 pm such that use of the lighting system 110 may correspond thereto while a bedroom may have ordinary usage outside this timeframe from 5:00 pm to 9:00 am such that use of the lighting system 110 may correspond thereto (with potential modifications for eliminating times when the lighting system 110 is not needed such as during ordinary sleep hours in the bedroom). As will be described in further detail below, the purpose of the location 105 may contribute to the mechanism of the exemplary embodiments and the manner in which the lighting system 110 operates through automated controls.

The lighting system 110 may include a plurality of lights that illuminate the location 105. For example, in a commercial site, the lighting system 110 may include ceiling fluorescent light bulbs whereas in a residential site, the lighting system 110 may include light bulbs in lamps. In providing the illumination to the location 105, the lighting system 110 may include further components that are connected to the lights. For example, the further components may include a power source, a current driver, etc. Those skilled in the art will understand that any variety of components that provide power to the lights of the lighting system 110 may be used for the lights to provide the illumination. The lights of the lighting system 110 may also be configured to be illuminated using various settings. In a first example, the lights may be configured to be fully illuminated or deactivated only. In a second example, the lights may be configured to be dimmable or otherwise use a non-fully illuminated state. That is, the lights may be configured to be fully illuminated, deactivated, or partially illuminated where the partial illumination may also include one or more different partial settings.

According to the exemplary embodiments, the control system 115 may represent a plurality of components used in determining how the lighting system 110 operates with regard to illuminating the location 105. The components of the control system 115 may include a manual input receiver 120, a MOAO device 125, an occupancy sensor 130, a photosensor 135, a clock 140, and a timer 145. As noted above, the components of the control system 115 may all be incorporated into a single device or may be distributed into different devices where each device may include one or more of the components. For example, the MOAO device 125 may be incorporated into a first device that also includes the occupancy sensor 130 and the manual input receiver 120. Accordingly, the photosensor 135, the clock 140, and the timer 145 may be incorporated into one or more separate devices which are connected to the first device. In another example, the sensing components of the occupancy sensor 130 and the photosensor 135 may be incorporated into a first device while the MOAO device 125, the clock 140, and the timer 145 may be incorporated into one or more separate devices which are connected to the first device. In a further example, all of the components may be separate from each other and are connected to communicate with one another.

The manual input receiver 120 may be any component that enables a person (herein referred to as a "user") to manually activate or deactivate the lighting system 110. For example, the manual input receiver 120 may be a light switch that when flipping in a first direction activates the lighting system 110 while flipping in a second opposite directed deactivates the lighting system 110. In another example, the manual input receiver 120 may be a single button receiver that is depressed to activate the lighting system 110 if the lighting system 110 is deactivated and to deactivate the lighting system 110 if the lighting system 110 is activated. In a further example, the manual input receiver 120 may be a wireless receiver that receives a signal from a wireless remote controlled by the user. The input from the manual input receiver 120 may override any automated control operation. That is, despite the control system 115 determining that the lighting system 110 is to remain activated, an input from the manual input receiver 120 to deactivate the lighting system 110 may take precedence.

The MOAO device 125 may be a component that enables different types of inputs to be used in determining the manner that the lighting system 110 operates. Specifically, the MOAO device 125 may receive inputs corresponding to manual or automated activation/deactivation of the lighting system 110. The MOAO device 125 may use the inputs to generate a signal to the lighting system 110 that indicates whether the lights are to be activated (e.g., fully illuminated), deactivated, or use another setting (e.g., an intermediate illumination). For example, the MOAO device 125 may receive a signal from the manual input receiver 120 indicating that a user has provided an input. The MOAO device 125 may accordingly generate the corresponding signal for the lighting system 110 to perform the appropriate illumination operation. In another example, the MOAO device 125 may receive one or more signals from the occupancy sensor 130, the photosensor 135, and/or the clock 140. As will be described in further detail below, the signals from these components may be used in determining how the lighting system 110 is to operate such that a corresponding signal is automatically generated and provided to the lighting system 110. It is noted that since the MOAO device 125 is configured to receive and process signals, there is no requirement for a particular disposition of the MOAO device 125 in the control system 115 or within the location 105. In fact, the MOAO device 125 may not even be required to be disposed in or near the location 105.

The occupancy sensor 130 may be any component that is configured to determine whether a user is present in the location 105. For example, the occupancy sensor 130 may be a passive infrared (PIR) occupancy sensor that detects movement in heat signatures. In another example, the occupancy sensor 130 may be an ultrasonic occupancy sensor, a tomographic motion detection occupancy sensor, a microwave occupancy sensor, an imager sensor, etc. Using the respective technology associated with the type of sensor, the occupancy sensor 130 may generate a signal for the MOAO device 125 that indicates whether the occupancy sensor 130 has detected an occupancy in the location. For example, the signal may be a high output when a heat signature has moved beyond a predetermined threshold to indicate that a user is present in the location 105. In another example, the signal may be a low output when no heat signature is detected or a heat signature has not moved beyond the predetermined threshold to indicate that no user is present in the location 105.

It is noted that since the occupancy sensor 130 is configured to determine an occupancy by a user in the location 105, the occupancy sensor 130 may be positioned so that an operating view is within the location 105. Furthermore, the occupancy sensor 130 may be strategically positioned (e.g., not too high, not facing an area with little to no activity, etc.) so that there is a highest probability of being able to detect an occupancy by a user in the location 105. It is also noted that based on a size of the location 105 and the capability of the occupancy sensor 130 (e.g., a size of the operating view), there may be one or more occupancy sensors 130 for the location 105.

The photosensor 135 may be any component that is configured to determine an illumination level of the location 105. For example, the photosensor 135 may be a photoemission sensor, a photoelectric sensor, a photovoltaic sensor, a photochemical sensor, a semiconductor sensor, a thermal sensor, etc. Using the respective technology associated with the type of sensor, the photosensor 135 may generate a signal for the MOAO device 125 that indicates whether the illumination level in the location 105 is above or below a predetermined illumination threshold. For example, the signal may be a high output when the detected illumination level in the location 105 is above the predetermined illumination threshold. In another example, the signal may be a low output when the detected illumination level in the location 105 is below the predetermined illumination threshold. As will be described in detail below, the detected illumination level may correspond to whether the lights of the lighting system 110 are providing an illumination level relative to the predetermined illumination threshold. However, depending on the time of day and whether further sources of light may be present (e.g., through a window), the photosensor 135 may measure both the ambient light from surrounding light sources and the electrical lighting of the lighting system 110. The photosensor 135 and/or a further component (e.g., the MOAO device 125) may be configured to consider the ambient light and filter the total illumination level being measured to indicate the illumination level corresponding to the lighting system 110.

It is noted that since the photosensor 135 is configured to determine the illumination level in the location 105, the photosensor 135 may be positioned so that an operating view is within the location 105. Furthermore, the photosensor 135 may be strategically positioned (e.g., in the direction of the lights of the lighting system 110) so that the detected illumination level corresponds to or is capable of being determined for the lights of the lighting system 110. For example, if the photosensor 135 were to be positioned such that the operating view is facing a set of the lights of the lighting system 115 in an enclosed room (e.g., no windows or other sources of ambient light), the detected illumination level may only be for the lighting system 110. In another example, if the photosensor 135 were to be positioned such that the operating view is facing a set of the lights of the lighting system 115 but also a large window, during the day, the illumination level may be measured by the photosensor 135 as a summation of the ambient light and the electrical light.

The clock 140 may be a time tracking component that indicates a time during the day. Specifically, the clock 140 may be a real time clock (RTC) that provides a real time during the day. The clock 140 may also track the day of the week and/or the month of the year. As will be described in further detail below, the clock 140 may provide an input used to define the predetermined illumination threshold to be used.

The timer 145 may be a time tracking component that indicates when a deactivation operation is to be performed on the lights of the lighting system 110. As those skilled in the art will understand, a MOAO configured lighting system may utilize a shutdown mechanism such that when the location 105 is determined to not have any users therein, a countdown may be started to when the lights are to be deactivated. The timer 145 may provide the countdown for the control system 115. The timer 145 may be any value and may depend on a variety of factors. For example, in a relatively large room, the timer 145 may be greater (e.g., 10 minutes) than in a relatively small room (e.g., 5 minutes). In another example, the timer 145 may be fixed and independent of any characteristics of the location 105 (e.g., 5 minutes). If cost effective and capable of being integrated with the exemplary embodiments, a determination unit may control the timer 145 in a dynamic manner to define a countdown duration appropriate for the location 105.

According to the exemplary embodiments, the control system 115 may utilize the components to verify whether a signal from the occupancy sensor 130 corresponds to other available information as provided through a signal from the photosensor 135. Specifically, the control system 115 may utilize the occupancy sensor 130 to detect movements of one or more users in the location 105, the photosensor 135 to measure the amount of illumination in the location 105, the clock 140 to indicate timing information to infer time-dependent occupancy, and the timer 145 to facilitate a delay adjusted automated deactivation operation. The control system 115 may therefore be configured to cross validate time-dependent occupancy detection and detect/correct false positives and false negatives of signals from the occupancy sensor 130. By detecting false positives or false negatives of the occupancy sensor 130, a more appropriate action may be taken by the control system 115 rather than inadvertently activating the lighting system 115 when no users are present in the location (e.g., a false positive from the occupancy sensor 130). For example, when the occupancy sensor 130 is a motion detector or a non-user heat source has shifted, the occupancy sensor 130 may indicate occupancy when there is no user in the location 105. The more appropriate action may also be taken by the control system 115 rather than inadvertently deactivating the lighting system 115 when one or more users are present in the location 105 (e.g., a false negative from the occupancy sensor 130). For example, when the one or more users present in the location 105 have not moved for a period of time such that the movement threshold of a PIR occupancy sensor is not passed, the occupancy sensor 130 may indicate that the location 105 is now empty and the timer 145 should be triggered that leads to the lighting system 115 being deactivated.

In confirming the signal from the occupancy sensor 130, the occupancy sensor 130 may perform its functionality and provide an input regarding the presence or absence of a user (e.g., based on movement of a detected heat source). The control system 115 may also provide a further signal based on an output from the photosensor 135 regarding whether the lighting system 110 is activated or deactivated (e.g., based on an illumination level). In this manner, there may be a plurality of different combinations that may result. In a first combination, the occupancy sensor 130 may indicate the presence of a user while the photosensor 135 may indicate the lighting system 110 is activated. In a second combination, the occupancy sensor 130 may indicate the absence of a user while the photosensor 135 may indicate the lighting system 110 is deactivated. In a third combination, the occupancy sensor 130 may indicate the presence of a user while the photosensor 135 may indicate the lighting system 110 is deactivated. In a fourth combination, the occupancy sensor 130 may indicate the absence of a user while the photosensor 135 may indicate the lighting system 110 is activated.

It is noted that for the following description of the exemplary embodiments, it may be considered that the signal from the photosensor 135 relates to the illumination level of the lighting system 110. It may also be considered that the lighting system 110 being fully illuminated may only be caused from an input being received by the manual input receiver 120 from a user in the location 105. That is, the lighting system 110 providing a full illumination may correspond to a situation where the location 105 is being occupied by at least one user. It is further noted that if a partial illumination setting is available and such a setting may be used in an automated manner, this setting would not satisfy the illumination threshold used with the measurement by the photosensor 135.

With the first combination, the occupancy sensor 130 returns an indication that there is at least one user in the location 105. Similarly, the photosensor 135 returns an indication that the lighting system 110 is activated which corresponds to at least one user being in the location 105. Therefore, the first combination corresponds to when the occupancy sensor 130 and the photosensor 135 measure the same result that there is at least one user in the location 105. That is, the photosensor 135 confirms the finding of the occupancy sensor 130. In other words, the signal from the occupancy sensor 130 is a true positive. In view of the occupancy sensor 130 being a true positive, the control system 115 may maintain the current setting for the lighting system 110 being activated. For example, the timer 145 is not triggered for a countdown to deactivate the lighting system 110.

With the second combination, the occupancy sensor 130 returns an indication that there is no user in the location 105. Similarly, the photosensor 135 returns an indication that the lighting system 110 is deactivated which corresponds to no user being in the location 105. Therefore, the second combination corresponds to when the occupancy sensor 130 and the photosensor 135 measure the same result that there is no user in the location 105. That is, the photosensor 135 confirms the finding of the occupancy sensor 130. In other words, the signal from the occupancy sensor 130 is a true negative. In view of the occupancy sensor 130 being a true negative, the control system 115 may maintain the current setting for the lighting system 110 being deactivated. For example, assuming an automatic activation functionality is configured for the control system 115, an automated activation operation for the lighting system 110 to a partial illumination level may not be performed.

With the third combination, the occupancy sensor 130 returns an indication that there is at least one user in the location 105. In contrast, the photosensor 135 returns an indication that the lighting system 110 is deactivated which corresponds to no user being in the location 105. That is, the lighting system 110 was not activated to reach the full illumination level which may only be achieved from a manual input via the manual input receiver 120. Therefore, the third combination corresponds to when the occupancy sensor 130 and the photosensor 135 measure different results. That is, the photosensor 135 verifies that the finding of the occupancy sensor 130 is incorrect. In other words, the signal from the occupancy sensor 130 is a false positive. In view of the occupancy sensor 130 being a false positive, the control system 115 may maintain the current setting for the lighting system 110 being deactivated. For example, assuming an automatic activation functionality is configured for the control system 110, an automated activation operation for the lighting system 110 to a partial illumination level may not be performed. In the scenario where there is a user who has entered the location 105 while the lighting system 110 is deactivated, the false positive result from the occupancy sensor 130 may still be addressed by the user manually activating the lighting system 110 using the manual input receiver 120. Thereafter, the first combination results and the control system 115 may proceed accordingly.

With the fourth combination, the occupancy sensor 130 returns an indication that there is no user in the location 105. In contrast, the photosensor 135 returns an indication that the lighting system 110 is activated which corresponds to the assumption that at least one user is in the location 105. That is, the lighting system 110 was manually activated to reach the full illumination level which may only be achieved from a manual input via the manual input receiver 120. Therefore, the fourth combination corresponds to when the occupancy sensor 130 and the photosensor 135 measure different results. That is, the photosensor 135 verifies that the finding of the occupancy sensor 130 is incorrect. In other words, the signal from the occupancy sensor 130 is a false negative. In view of the occupancy sensor 130 being a false negative, the control system 115 may deactivate the lighting system 110. For example, the timer 145 may be triggered for a countdown to deactivate the lighting system 110.

It is noted that the control system 115 may be equipped with a tolerance threshold that is used to improve the performance of whether the lighting system 110 should be deactivated. For example, although the lighting system 110 is activated, there may indeed be no user in the location 105. Thus, the tolerance threshold may be a further timer which measures the duration of time that the occupancy sensor 130 continues to measure an absence of any user in the location 105 while the photosensor 135 continues to measure an illumination level that satisfies the predetermined illumination threshold (i.e., the fourth combination continues to be identified). In a particular manner of tracking the time, the clock 140 may provide a first timestamp when the first instance of the fourth combination is identified. The first timestamp may indicate when the tolerance threshold is triggered. When the tolerance threshold is passed (e.g., a second timestamp is identified, a difference between the second timestamp and the first timestamp being greater than the tolerance threshold) and the occupancy sensor 130 has measured only absences, then the control system 115 may assume that the occupancy sensor 130 is reporting a true negative and not a false negative. Thus, the timer 145 for the countdown to deactivate the lighting system 110 may be triggered. However, if at any time during the tolerance threshold (from the first timestamp to any time prior to the second timestamp) the occupancy sensor 130 has measured a presence of a user, then the control system 115 may again assume that the occupancy sensor 130 is reporting a false negative. This tolerance threshold may continuously be used until the timer 145 is triggered.

The predetermined illumination threshold used to compare the measurement from the photosensor 130 may be determined in a variety of manners. In a first example, the predetermined illumination threshold may be set to a fixed lumen value such that any illumination measurement greater than the fixed lumen value indicates that the lighting system 110 is activated and any illumination measurement less than the fixed lumen value indicates that the lighting system 110 is deactivated.

In a second example, the predetermined illumination threshold may depend on various factors. As noted above, the location 105 may be for a variety of purposes and may exhibit various sizes. Accordingly, a space setting of the location 105 may be a contributing factor in determining the predetermined illumination threshold. Specifically, the space setting may consider the parameters of the space for the location 105 where the lighting system 115 is being utilized. For example, if the location 105 is a commercial building, it is more likely to be occupied during business hours while if the location 105 is a residential building, it is more likely to be occupied during off-business hours. The accessibility of daylight or other sources of ambient light may further be factored into the space settings. Accordingly, the control system 115 may be commissioned with the factors to identify how the predetermined illumination setting is to be set for the location 105. It is noted that if cost effective and capable of being incorporated, the predetermined illumination threshold may be determined dynamically based on any changing factor in the location 105 and could be based on a calibration where the system 100 is installed.

With the predetermined illumination threshold being capable of being set with the space settings, the time of day indicated by the clock 140 may provide an input to the control system 115. Specifically, the time of day along with the space settings may provide the predetermined illumination threshold to be used. As the space settings may also compensate for an average ambient light in the location 105 at the time from the clock 145, the predetermined illumination threshold may indicate whether the lighting system 110 is activated or deactivated based on the measured illumination from the photosensor 130. Accordingly, the predetermined illumination threshold may be time-dependent and space-customized.

It is noted that the tolerance threshold may also be based on a variety of factors. For example, if the location 105 is a high traffic area, the tolerance threshold may be set relatively low. However, if the location 105 is a low traffic area, the tolerance threshold may be set relatively high. The tolerance threshold may also be set based on the time provided by the clock 145. For example, if the location 105 is a commercial building, the time may indicate whether there is an average high or low traffic of users. Based on this average traffic, the tolerance threshold may be set accordingly.

Figure 2:
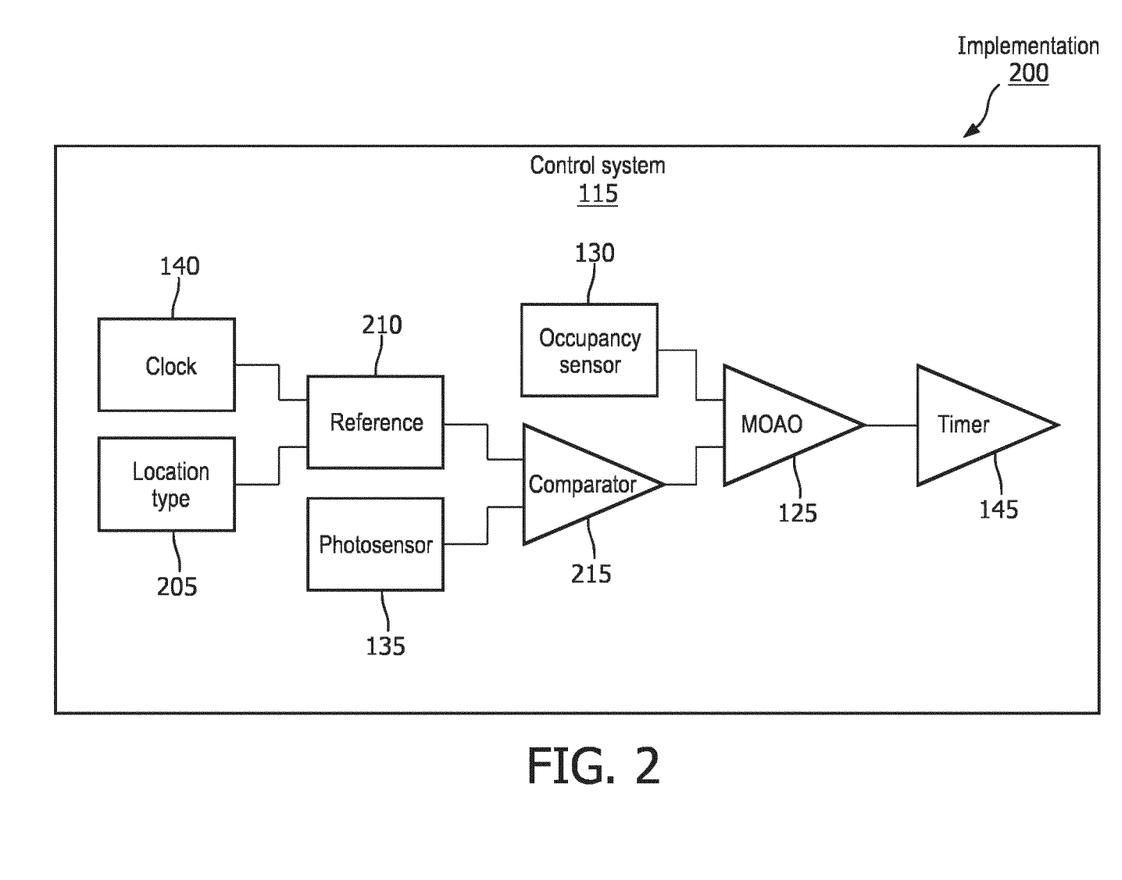
FIG. 2 shows an implementation of the system of FIG. 1 according to the exemplary embodiments.

FIG. 2 shows an implementation 200 of the system 100 of FIG. 1 according to the exemplary embodiments. The implementation 200 relates to an exemplary embodiment in which the system 100 comprises circuitry components. For example, the MOAO device 125, the occupancy sensor 130, the photosensor 135, and the timer 145 may each be a circuitry component. Therefore, the implementation 200 of FIG. 2 may represent a schematic of a circuit diagram. The implementation 200 may utilize a comparison between a signal from the occupancy sensor 130 to a status of the lighting system 110 to confirm or deny the result of the occupancy sensor 130. In this manner, the MOAO device 125 may take an appropriate action.

The implementation 200 may be any circuitry implementation in which the components are interconnected with one another for signals to be exchanged. These components may be included on one or more integrated circuits, on one or more printed circuit boards, or implemented individually as needed. In this exemplary implementation 200, the measurements from the various components may be provided at various time intervals. In a first example, the measurements may be provided continuously. In a second example, the measurements may be provided at fixed time intervals (e.g., every 10 seconds, every 1 minute, etc.). Based on the measurements, the MOAO 125 may determine the appropriate action.

It is noted that the timing of when the measurements are made and the sequence described herein for the implementation 200 is only exemplary. That is, the measurements may be made at different times but the comparison may be made such that corresponding measurements are used (measurements at the same time).

As illustrated in the implementation 200, the clock 140 may indicate the time of the day. The location type 205 and the associated space settings may also be determined. Thus, based on the time from the clock 140 and the location type 205, a reference 210 may be determined. Specifically, the reference 210 may be the predetermined illumination threshold. Once the reference 210 is determined, a measurement from the photosensor 135 may be determined. The reference 210 and the measurement from the photosensor 135 may be fed into a comparator 215 in which the measurement is compared to the reference 210. If the measurement is greater than the reference 210, the comparator 215 may have a high output indicating that the lighting system 110 is activated. If the measurement is less than the reference 210, the comparator 215 may have a low output indicating that the lighting system 110 is deactivated.

Before the MOAO device 125 performs its functionality, a measurement from the occupancy sensor 130 may be determined. Assuming a PIR occupancy sensor, if the measurement is greater than a movement threshold, the occupancy sensor 130 may have a high output indicating that there is occupancy in the location 105. If the measurement is lower than the movement threshold, the occupancy sensor 130 may have a low output indicating that there is no occupancy in the location 105.

Using the output from the comparator 215 and the output from the occupancy sensor 130, the MOAO device 125 may perform the appropriate action. The MOAO device 125 may determine the combination of the outputs (e.g., high-high, low-low, high-low, and low-high) to identify whether the occupancy sensor has output a true positive, a true negative, a false positive, or a false negative (respectively). As noted above, if the outcome of the MOAO device 125 is a true positive or a true negative, the current light setting for the lighting system 110 may be maintained. If the outcome of the MOAO device 125 is a false positive, the current light setting for the lighting system 110 may remain deactivated and if a user is indeed in the location 105, a manual input to activate the lighting system 110 may be received. If the outcome of the MOAO device 125 is a false negative, the MOAO device 125 may receive a timestamp from the clock 140. If the false negative is first identified, the timestamp may be used to trigger the tolerance threshold. If a previous false negative was identified, the timestamp may be used to determine whether the tolerance threshold has passed. If the tolerance threshold has passed and the false negative persists, the MOAO device 125 assumes that the occupancy sensor 130 is generating a true negative and the timer 145 is triggered to initiate the countdown to deactivate the lighting system 110.

The implementation 200 described above relates to the system 100 being a set of circuitry components. However, the system 100 may also be implemented in a variety of other ways. For example, the system 100 may include more complex components, particularly if dynamic settings and/or thresholds are to be used. In another exemplary embodiment of the system 100, the MOAO device 125 may be a computing component to which the other components of the system 100 are connected. In such an embodiment, the MOAO device 125 may include a processor, a memory arrangement, transceiver, and other components.

Figure 3:
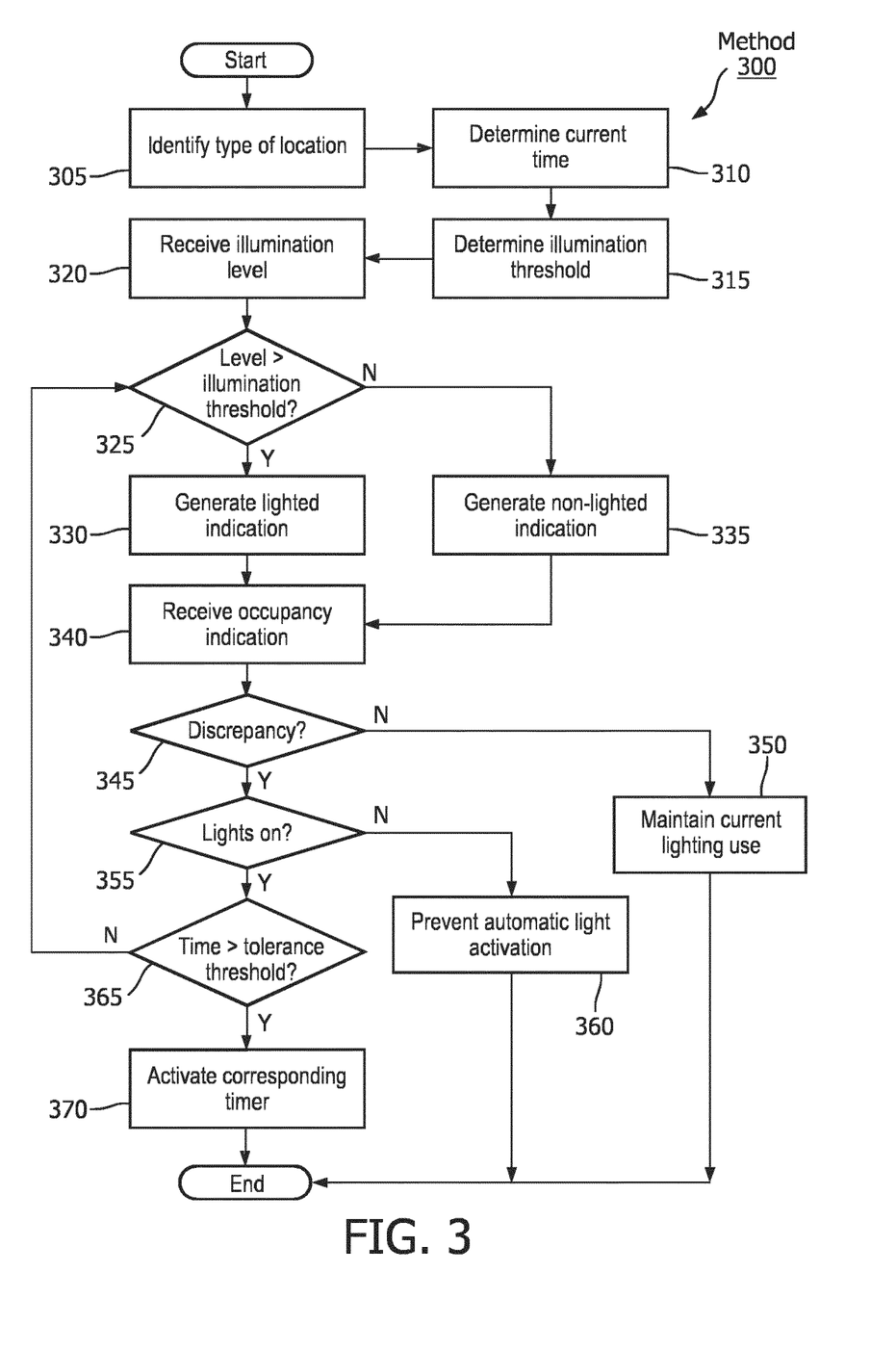
FIG. 3 shows a method for determining occupancy according to the exemplary embodiments.

FIG. 3 shows a method 300 for determining occupancy in the location 105 according to the exemplary embodiments. Specifically, the method 300 may relate to the mechanism of the exemplary embodiments in which the output of the occupancy sensor 130 is verified based on an output based on the photosensor 135. The method 300 will be described from the perspective of the control system 115 as configured in the implementation 200 in which the components of the system 100 are circuitry units. The method 300 will also be described with regard to the system 100 of FIG. 1.

In 305, the control system 115 identifies the type of location (e.g., location type 205). As noted above, the type of location may entail when occupancy may be expected as well as space settings that may indicate levels of ambient light. In 310, the control system 115 determines a current time based on an input from the clock 140. Accordingly, in 315, the predetermined illumination threshold (e.g., reference 210) may be determined from the location type 205 and the time of day.

In 320, the illumination measured by the photosensor 135 may be received. As noted above, the photosensor 135 may utilize any mechanism to measure a summation of the ambient light (light from other sources) and the electrical light (light from the lighting system 110). With the predetermined illumination threshold compensating for any ambient lighting, in 325, the control system 115 determines whether the illumination level is greater than the predetermined illumination threshold. That is, the control system 115 determines whether the lighting system 110 is activated at a full illumination intensity which require that a user provided an input to the manual input receiver 120 to initiate the illumination. If the illumination level is greater than the predetermined illumination threshold, in 330, a lighted indication is generated specifying that the lighting system 110 is activated. If the illumination level is less than the predetermined illumination threshold, in 335, a non-lighted indication is generated specifying that the lighting system 110 is deactivated.

In 340, the occupancy as measured by the occupancy sensor 130 may be received. As noted above, the occupancy sensor 130 may utilize any mechanism to measure whether there is a measurable movement that occurred in the location 105. In 345, the control system 115 determines whether there is a discrepancy between the output based on the photosensor 135 and the output based on the occupancy sensor 130. As noted above, an agreement may correspond to the first and second combinations while a discrepancy may correspond to the third and fourth combinations. If there is no discrepancy, the control system 115 continues to 350 where the current lighting use is maintained. For example, with the first combination, the lighting system 110 remains activated. In another example, with the second combination, the lighting system 110 remains deactivated.

If there is a discrepancy, the control system 115 continues from 345 to 355. In 355, the control system 115 determines whether the lighting system 110 is activated (e.g., the outcome from 325). If the lighting system 110 is deactivated, the scenario being addressed may correspond specifically to the third combination where occupancy is detected but the lighting system 110 is deactivated. Thus, in 360, the control system 115 prevents any automatic activation of the lighting system 110 (e.g., a partial illumination operation). If a user is present in the location 105, the user may manually provide an input to the manual input receiver 120.

If the lighting system 110 is activated, the scenario being addressed may correspond specifically to the fourth combination where occupancy is not detected but the lighting system 110 is activated. Thus, in 365, the control system 115 determines whether the amount of time that the fourth combination has been identified exceeds a tolerance threshold. If the tolerance threshold is not exceeded, the control system 115 returns to 325 where another iteration of the analysis is performed. However, if the tolerance threshold is exceeded, the control system 115 continues to 370 where the timer 145 is triggered to initiate the countdown to deactivate the lighting system 110.

The exemplary embodiments provide a device, system, and method of overcoming scenarios arising from false positives and false negatives being generated by an occupancy sensor in a manual on—auto off lighting system. As a false positive leads to the lighting system potentially being automatically activated (e.g., to a partial illumination setting), there is unnecessary power consumption. As a false negative leads to the lighting system being used improperly by deactivating while users are still at the location, there is disruptive lighting use. Accordingly, by incorporating a photosensor to confirm or deny the output of the occupancy sensor, these false outcomes may be handled in a more appropriate manner.

Those skilled in the art will understand that the above-described exemplary embodiments may be implemented in any suitable software or hardware configuration or combination thereof. In a further example, the exemplary embodiments of the above described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A system, comprising:
   an occupancy sensor configured to generate a first measurement of an occupancy within a location that is configured to be illuminated by at least one light in a lighting system;
   a photosensor configured to generate a second measurement of an illumination level within the location, the illumination level indicative of the occupancy within the location;
   a control device determining an occupancy state in the location based on the first measurement, the control device determining a result of validating the determined occupancy state based on the second measurement, an agreement between the first and second measurements validating the determined occupancy state, a discrepancy between the first and second measurements invalidating the determined occupancy state, the control device configured to generate a signal based on the result; and
   a manual on-auto off (MOAO) device receiving the signal to perform a corresponding operation on the lighting system;
   wherein the illumination level of the second measurement being greater than the predetermined illumination threshold is indicative of the lighting system being activated and wherein the illumination level of the second measurement being less than the predetermined illumination threshold is indicative of the lighting system being deactivated.

2. The system of claim 1, wherein the location has a character type and a space setting, the character type indicative of a frequency of the occupancy at a given time, the space setting indicative of an ambient light of the location at the given time.

3. The system of claim 2, further comprising:
   a clock configured to provide the given time.

4. The system of claim 2, wherein the control device identifies a predetermined illumination threshold based on the character type and the space setting of the location.

5. The system of claim 1, wherein the agreement corresponds to one of a first agreement where the lighting system is determined to be activated and a positive occupancy is determined or a second agreement where the lighting system is determined to be deactivated and a negative occupancy is determined and wherein the discrepancy corresponds to one of a first discrepancy where the lighting system is determined to be activated and the negative occupancy is determined or a second discrepancy where the lighting system is determined to be deactivated and the positive occupancy is determined.

6. The system of claim 5, wherein the control device generates the signal for the MOAO device when the second discrepancy is determined, the signal indicating the lighting system is to be deactivated.

7. The system of claim 6, further comprising:
   a timer configured to provide a countdown to deactivating the lighting system upon the receipt of the signal by the MOAO device.

8. The system of claim 6, wherein the control device identifies a tolerance threshold prior to providing the signal to the MOAO device, the tolerance threshold indicating a duration of time that the second discrepancy has continued to be determined, the control device providing the signal when the tolerance threshold has expired.

9. A method, comprising:
   receiving a first measurement of an occupancy within a location being illuminated by at least one light of a lighting system;
   receiving a second measurement of an illumination level within the location, the illumination level indicative of the occupancy within the location;
   determining an occupancy state in the location based on the first measurement;
   determining a result of validating the determined occupancy state based on the second measurement, an agreement between the first and second measurements validating the determined occupancy state, a discrepancy between the first and second measurements invalidating the determined occupancy state;
   generating a signal based on the result for a manual on-auto off (MOAO) device to perform a corresponding operation on the lighting system; and
   wherein the illumination level of the second measurement being greater than the predetermined illumination threshold is indicative of the lighting system being activated and wherein the illumination level of the second measurement being less than the predetermined illumination threshold is indicative of the lighting system being deactivated.

10. The method of claim 9, wherein the location has a character type and a space setting, the character type indicative of a frequency of the occupancy at a given time, the space setting indicative of an ambient light of the location at the given time, the method further comprising:
    identifying a predetermined illumination threshold based on the character type and the space setting of the location.

11. The method of claim 9, wherein the agreement corresponds to one of a first agreement where the lighting system is determined to be activated and a positive occupancy is determined or a second agreement where the lighting system is determined to be deactivated and a negative occupancy is determined and wherein the discrepancy corresponds to one of a first discrepancy where the lighting system is determined to be activated and the negative occupancy is determined or a second discrepancy where the lighting system is determined to be deactivated and the positive occupancy is determined.

12. The method of claim 11, wherein the signal is generated when the second discrepancy is determined, the signal indicating the lighting system is to be deactivated, the method further comprising:
    activating a timer configured to provide a countdown for the MOAO device to deactivate the lighting system.

* * * * *